Sept. 17, 1935.  H. J. L. FRANK ET AL  2,014,729
TROLLEY DUCT
Filed Oct. 29, 1934
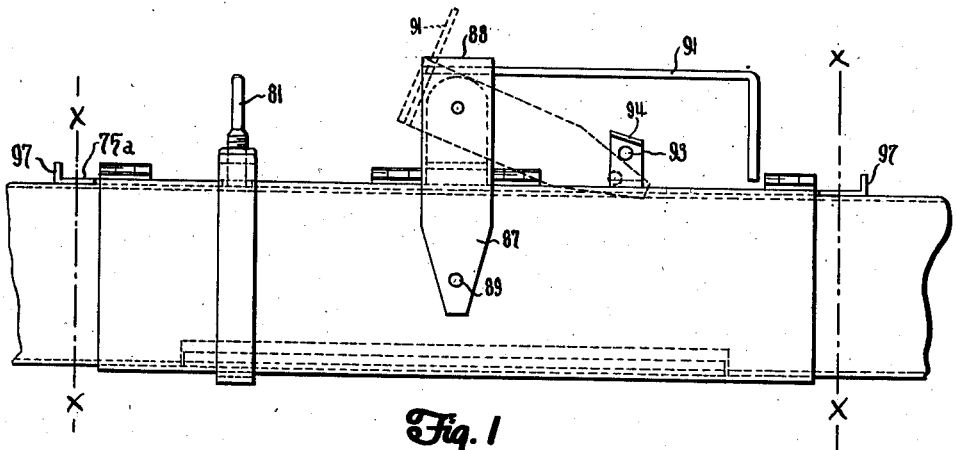
Fig. 1
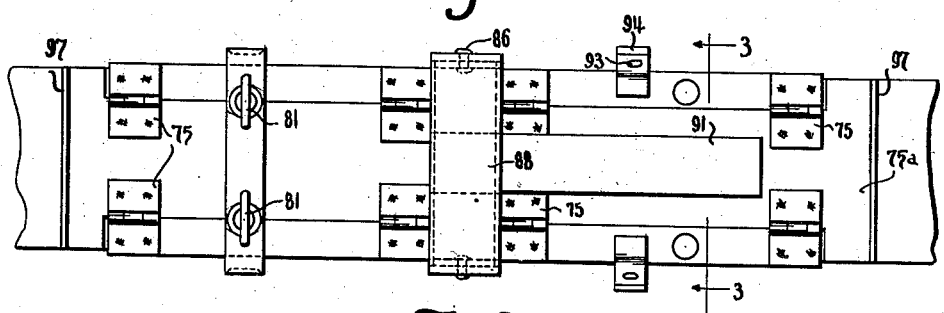
Fig. 2
Fig. 3
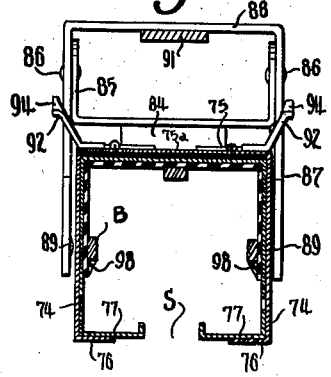
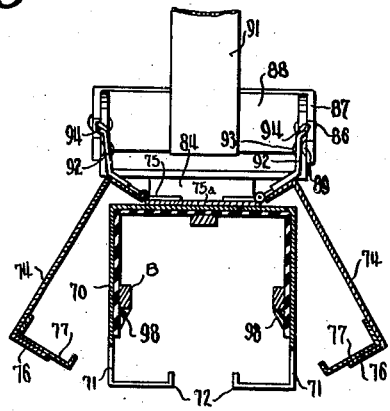
Fig. 4
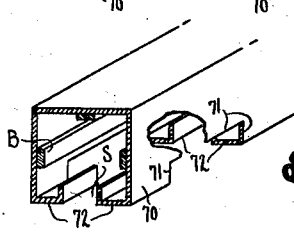
Fig. 5
INVENTORS.
Harrison J. L. Frank
William A. Harper
BY
Daniel G. Cullen
ATTORNEY.

Patented Sept. 17, 1935

2,014,729

UNITED STATES PATENT OFFICE 2,014,729

TROLLEY DUCT

Harrison J. L. Frank and William A. Harper, Detroit, Mich., assignors to Bulldog Electric Products Company, Detroit, Mich., a corporation of West Virginia Application October 29, 1934, Serial No. 750,491

14 Claims. (Cl. 247—3)

This application relates to current distribution systems and more particularly to a trolley duct forming part of a current distribution system.

In a prior application, Serial No. 674,183, filed June 3, 1933, there is disclosed a system including a long run of trolley duct of the rectangular hollow casing type and having a narrow elongated continuous riding slot in its bottom wall. In order to permit a trolley to be inserted or plugged into said duct at convenient points intermediate the ends thereof, even though such trolley is not of the type that because of its own construction can be inserted into the duct through the narrow slot, there are provided in the trolley duct of that application, in a manner here disclosed, and at desired points, intermediate entrances. These are in the nature of slot enlargements or cutouts through which may be inserted the trolleys, the cutouts being normally closed by hingedly mounted fill-in portions which normally fill in the cutouts, but which may be swung open to expose them for trolley insertion. The fill-in portions maintain uninterrupted the smooth continuity of the duct and have rail portions forming replacements of the cutaway rail portions.

In this application there is also disclosed a clamping arrangement whereby the rail portions, when swung into fill-in position may be properly aligned with the rail portions of the remainder of the duct to form smooth, continuous rails.

This application discloses, for use with an entrance, means whereby the hingedly mounted carrier plates of a dropout section may be opened by a manually operable opening device which carry the fill-in sections, which is so constructed that it may swing the carrier plates to and hold them in open position to permit trolley insertion. The opening device may be manipulated, by return of the handle, to close the carrier plates and bring pressure upon them to align their fill-in portions properly with respect to the remainder of the duct.

For an understanding of the disclosure of this application, reference will be had to the appended drawing, which shows a section of trolley duct having an intermediate entrance. In this drawing, Fig. 1 is a side view of a trolley duct section at an intermediate entrance;

Fig. 2 is a top plan view of the same;

Fig. 3 is a section view as if on line 3—3 of Fig. 2, showing the entrance closing parts in entrance closing position;

Fig. 4 is a similar view showing the same parts in entrance clearing position;

And Fig. 5 is a diagrammatic view showing the entrance cut away.

Wherever an intermediate entrance in a trolley duct is desired, the same may be and as shown is provided in a duct section between ends thereof, and therefore the intermediate entrance need not be provided with any means to connect section ends, that is to say, casing ends and bus bar ends. The entrance is formed by cutting away the lower part of the sheet metal casing, below the level of the bus bars B, substantially as indicated diagrammatically in Fig. 5, which shows a sheet metal casing 70 cut away on the cut lines 71. This cuts off the bottom of the casing and the rail flanges 72 and enlarges the slot or runway S at the bottom of the casing, in alignment with the cut lines 71. These enlargements permit insertion into the duct of trolleys of the type shown in application Serial No. 674,182, filed June 3, 1933.

Since the bottom of the casing, where it is cut away, is not restricted by the bottom wall, the insertion or removal of a trolley or collector at this point is a simple matter, as can readily be observed; however, the bottom must be closed and the rail flanges 72 continued if a satisfactory distribution system is to be provided; otherwise the trolley would drop out whenever it reached an intermediate entrance.

At the entrance there is provided on each side of the section, a swinging carrier plate 74, hinged at 75, to a plate 75a secured to the top wall of the sheet metal casing. Each of the plates 74 has its lower edge inwardly flanged as at 76. Secured to such flanges are fill-in portions 77 which are identically dimensioned with, and may actually be, those parts of the duct casing 70 that were cut away on the cut lines 71. For all practical purposes they may be considered as identical with the parts that were removed. These fill-in portions close the entrances and have rail portions which continue the rail flanges 72.

When the carrier plates 74 are in the position of Fig. 4, that is to say, swung upwardly, the insertion of a trolley or collector into the duct at the entrance may readily be effected, the duct having no bottom at the entrance; however, for normal use the carrier plates 74 are swung inwardly to the position of Fig. 3 so that the fill-in parts 77 will occupy the position they occupied before they were cut away from the duct. The bottom of the duct will now be closed and will be restored to its original position.

For holding the carrier plates against the sheet metal casing and in the position of Fig. 3, there is provided a C clamp 80, surrounding the duct and loosely slidable therealong. With the C clamp is provided threaded wing screws 81 adapted to bear against the top surface of the duct. When the screws are fully retracted, the C clamp will drop from the position of Fig. 1, and may be slid, from a point adjacent the hinges 75, where it engages the ends of the plates 74, longitudinally along the duct to clear the plates 74 and permit these to be moved to the position of Fig. 4.

When it is desired to close the duct, the carrier plates are returned to the position of Fig. 3 and the C clamp is returned to its clamping position and is then pulled upwardly by means of the threaded screws 81, to the position of Fig. 1, where it clamps the carrier plates in place.

It is observed that the screws 81 thread through the clamp 80 and that their lower ends bear against the upper surface of the sheet metal casing 70. Accordingly, when the screws are rotated or threaded further into the C clamp they not only pull the C clamp up but, also, due to the engagement of the C clamp with the carrier plates, cause proper alignment of the carrier plates and the fill-in parts 77 carried thereby with the remaining parts of the duct structure.

It is further noted that the C clamp supports the weight of the plates 74 and the trolleys which are supported by the rail portions of the fill-in parts 77, when the duct is closed, thus relieving the hinges 75 from the necessity of so supporting the parts. The plates 74 are free of the necessity of supporting trolleys, when they are swung open, and accordingly, do not stress the hinges more than is required by their own weight, and then only, during the few moments when a trolley is being introduced into the duct through the intermediate entrance.

Secured to the top of the duct substantially midway between the ends of the carrier plates, and spaced from the duct by a bar 84 to provide clearance for the carrier plates as they swing, is a U-shaped bracket 85 to whose upstanding portions, at 86, are pivotally connected the sides 87 of an inverted U-shaped rotating arm having a bight 88. The extremities of portions 87 of this arm embrace the carrier plates between them and are provided with struck-out ball points 89 which engage the swinging plates for purposes to be indicated. Secured to the bight 88 of the operating arm is an L-shaped handle 91. This handle may be rotated manually about the pivots 86, whereby the operating arm will also rotate about the pivots, the assembly of the operating arm and the handle 91 moving as a bell crank about the pivots 86.

Secured to the carrier plates on the tops thereof and projecting upwardly therefrom are straps 92 which are disposed in the path of movement of the extremities of portions 87 of the operating arm and which have indentations or ball seats 93 conforming to the ball points 89 of the operating arm portions 87.

When the carrier plates are in entrance closing position, they are in the position of Fig. 1; handle 91 lies closely alongside the duct, so as not to project too far from the duct and so as not to be in the way of objects moving about the duct. The depending portions 87 of the operating arm 88 tightly embrace the carrier plates between them and urge them into entrance closing position and urge the fill-in parts 77 into proper alignment with the remainder of the duct, the rail portions thereof thus forming smooth continuations of the rail portions of the remainder of the duct. The resilience of the operating arm produces a clamping action and may be relied upon, even to the extent of omitting clamp 80, for clamping in the fill-in portions 77.

When it is desired to clear the entrance, the clamp 80 is loosened and moved along the duct away from the carrier plates; then the handle 91 is rotated counterclockwise, whereupon the operating arm will first free itself from the carrier plates and then engage the straps 92. Since these are inclined outwardly into the path of the extremities of the operating arm, they will be urged towards each other by continued movement of the operating arm. The carrier plates, being securely attached to these straps, will correspondingly move outwardly to the position of Fig. 4 to clear the entrance.

Proper movement of the handle 91 will cause ball points 89 to register with ball seats 93 and the interlock thus provided will cause the parts to maintain a balanced condition with the carrier plates held open against accidental closing movement. However, when the entrance is to be closed, the handle 91 is rotated back to its closing position. While the interlock afforded by the engagement of ball points 89 with ball seats 93 offers slight opposition to movement of the parts back to closing position, such opposition is not enough to prevent such movement.

It will be observed that the straps 92 are provided with bent lugs 94. These prevent movement of the extremities of the operating arm past the ends of the straps 92 and beyond them, such movement being undesirable because it would permit the carrier plates to drop back to closing position though the bell crank assembly is beyond its open position, and because it would make it necessary to exercise additional manual manipulations in order to restore the parts to proper cooperating relation. However, the lugs 94 might well be omitted, as might also be the ball seats 93 when the functions provided by these parts is not considered necessary.

If desired, there may be provided, in addition to the C clamp 80 which secures the carrier plates and fill-in portions to the duct in the position of Fig. 3, other C clamps, like those at 80, for securing the drop-out section as a whole to the duct, and these clamps may be positioned at X—X between the hinges 75 and the bent up lips 97 of plate 75a, so that when tightened up, the drop-out section as a whole may be secured to the duct.

It will be observed that the drop out section here shown is formed as an integral unit and is applicable, as a unit, to an existing duct provided with appropriate cut-aways in the track, and is interchangeable with other drop-out sections for any desired purpose.

It will also be observed that the C clamp 80 shown may well be omitted, in which case reliance may be placed on the parts 85—91 alone for clamping the carrier plates in the position of Fig. 3. With the C clamp 80 omitted, as is preferred, the parts 85—94 provide a quickly operable means for closing or opening the drop-out section.

It will also be observed that within the length of the drop-out section, insulation pieces 98 of triangular cross section are provided under the side bus bars B to facilitate trolley insertion by guiding the side thrust rollers to the bus bars easily and smoothly.

We claim:

1. In combination with a trolley duct having tracks and a slot at a bottom wall thereof and an intermediate trolley entrance provided by cutting away said tracks to create an enlargement of said slot, fill-in parts for replacing the cut-away parts of the tracks and filling in the slot enlargements so as to preserve the continuity of the tracks, and means carrying said fill-in parts.

2. In combination with a trolley duct having tracks and a slot at a bottom wall thereof and an intermediate trolley entrance provided by cutting away said tracks to create an enlargement of said slot, fill-in parts for replacing the cut-away parts of the tracks and filling in the slot enlargements so as to preserve the continuity of the tracks, and means carrying said fill-in parts, and means for moving said fill-in parts to and from their fill-in and slot-exposing positions.

3. In combination with a trolley duct having tracks and a slot at a bottom wall thereof and an intermediate trolley entrance provided by cutting away said tracks to create an enlargement of said slot, fill-in parts for replacing the cut-away parts of the tracks and filling in the slot enlargements so as to preserve the continuity of the tracks, and means carrying said fill-in parts, and means for moving said fill-in parts to and from their fill-in and slot-exposing positions, with the fill-in parts being supported by and in association with the duct during their movement.

4. In combination with a trolley duct having tracks and a slot at a bottom wall thereof and an intermediate trolley entrance provided by cutting away said tracks to create an enlargement of said slot, fill-in parts for replacing the cut-away parts of the tracks and filling in the slot enlargements so as to preserve the continuity of the tracks, and means carrying said fill-in parts, and means for moving said fill-in parts to and from their fill-in and slot-exposing positions, said means being manually manipulable and functioning to securely latch said fill-in parts in fill-in position.

5. In combination with a trolley duct having tracks and a slot at a bottom wall thereof and an intermediate trolley entrance provided by cutting away said tracks to create an enlargement of said slot, fill-in parts for replacing the cut-away parts of the tracks and filling in the slot enlargements so as to preserve the continuity of the tracks, and means carrying said fill-in parts, and means for moving said fill-in parts to and from their fill-in and slot-exposing positions, said means being manually manipulable and functioning to securely latch said fill-in parts in fill-in or slot-exposing position.

6. A duct system including a casing having an elongated path in its bottom wall, the path being narrower than the bottom wall so that the path forms a restricted entrance into the interior of the duct, and an entrance means permitting unrestricted entrance into the duct where the bottom wall is cut away, entirely, and including side plates hingedly connected to said duct and having portions movable to replace those parts of the duct bottom wall which had been cut away, the side plates being on opposite sides of the duct.

7. A duct system including a casing having an elongated path in its bottom wall, the path being narrower than the bottom wall so that the path forms a restricted entrance into the interior of the duct, and an entrance means permitting unrestricted entrance into the duct where the bottom wall is cut away entirely, and including side plates hingedly connected to said duct and having portions movable to replace those parts of the duct bottom wall which had been cut away, and C clamps surrounding the duct and slidable therealong for clamping said side plates in entrance closing position.

8. For use with trolleys having enlarged heads and small depending portions, a trolley duct system including an elongated hollow casing receiving said heads and having an elongated trolley riding path in a wall thereof receiving said depending portions, the path being narrower than the wall so that the path forms a restricted entrance into the interior of the duct, the duct having rail portions, entrance means permitting unrestricted entrance into the duct at desired points along said duct, said means including cutouts in said wall and rail portions, enlarging said path at said points, and fill-in plates movably connected to said duct and having portions movable to replace those parts of the duct wall and rail portions which had been cut away to enlarge the path.

9. A trolley duct system including a hollow duct having opposite sides terminating at their edges in inturned rail flanges separated by a narrow trolley riding path, said flanges being notched at desired points to enlarge said path and provide intermediate entrances for trolleys having enlarged heads for riding in said duct and on said path, plates hinged to said casing and provided with rail flanges fitting in said notches and completing the rail flanges of the duct to form continuous rail flanges.

10. For use with trolleys having enlarged heads and small depending portions, a trolley duct system including an elongated hollow casing receiving said heads and having an elongated trolley riding path in a wall thereof receiving said depending portions, the path being narrower than the wall so that the path forms a restricted entrance into the interior of the duct, the duct having rail portions, entrance means permitting unrestricted entrance into the duct at desired points along said duct, said means including cutouts in said wall and rail portions, enlarging said path at said points, and fill-in portions hingedly connected to said duct and having portions movable to replace those parts of the duct wall and rail portions which had been cut away to enlarge the path, the hinged lines for said hingedly connected portions being parallel to the aforesaid wall of the duct and remote therefrom, whereby trolley loads bearing on said fill-in portions will tend to urge them into fill-in position.

11. In a trolley bus duct run of the type comprising a rectangular duct having a longitudinal narrow continuous slot in a bottom wall, the latter providing trolley rails, trolley drop-out or intermediate entrance means provided by a long cut-away in a side wall and in the bottom wall, extending from the side wall to the slot, and a fill-in piece for said cut-away of substantially the shape and dimensions of the cut-away and constructed to fill in said cut-away when inserted and held therein in a manner to maintain uninterrupted the interior contour of said duct and the rails provided by the bottom wall, and movable from said cut-away.

12. In a trolley bus duct run of the type comprising a rectangular duct having a longitudinal narrow continuous slot in a bottom wall, the latter providing trolley rails, trolley drop-out or intermediate entrance means provided by a long cut-away in a side wall and in the bottom wall, extending from the side wall to the slot, and a fill-in piece for said cut-away of substantially the shape and dimensions of the cut-away and constructed to fill in said cut-away when inserted and held therein in a manner to maintain uninterrupted the interior contour of said duct and the rails provided by the bottom wall, and movable from said cut-away, said fill-in piece being non-removable from the duct so that in its movement to and from the cut-away it is supported by said duct.

13. In a trolley bus duct run of the type comprising a rectangular duct having a longitudinal narrow continuous slot in a bottom wall, the latter providing trolley rails, trolley drop-out or intermediate entrance means provided by a long cut-away in a side wall and in the bottom wall, extending from the side wall to the slot, and a fill-in piece for said cut-away of substantially the shape and dimensions of the cut-away and constructed to fill in said cut-away when inserted and held therein in a manner to maintain uninterrupted the interior contour of said duct and the rails provided by the bottom wall, and movable from said cut-away, and clamp means surrounding the duct and bearing against the top wall thereof for maintaining and clamping said fill-in piece in said cut-away and for rigidifying the duct at said cut-away.

14. A construction of the character described in claim 1 wherein the fill-in parts are on opposite sides of the duct and wherein there are means for moving said parts simultaneously out of fill-in position.

HARRISON J. L. FRANK.
WILLIAM A. HARPER.